United States Patent
Kitazoe et al.

(10) Patent No.: US 9,215,731 B2
(45) Date of Patent: Dec. 15, 2015

(54) METHOD AND APPARATUS FOR TRANSFER OF A MESSAGE ON A COMMON CONTROL CHANNEL FOR RANDOM ACCESS IN A WIRELESS COMMUNICATION NETWORK

(75) Inventors: Masato Kitazoe, Tokyo (JP); Arnaud Meylan, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 490 days.

(21) Appl. No.: 12/337,383

(22) Filed: Dec. 17, 2008

(65) Prior Publication Data

US 2009/0163211 A1    Jun. 25, 2009

Related U.S. Application Data

(60) Provisional application No. 61/015,159, filed on Dec. 19, 2007.

(51) Int. Cl.
| | |
|---|---|
| *H04J 3/02* | (2006.01) |
| *H04W 74/00* | (2009.01) |
| *H04W 74/08* | (2009.01) |
| *H04W 12/10* | (2009.01) |

(52) U.S. Cl.
CPC ........ *H04W 74/004* (2013.01); *H04W 74/0866* (2013.01); *H04W 12/10* (2013.01); *H04W 74/0833* (2013.01)

(58) Field of Classification Search
USPC .................. 370/310–350, 431–463; 455/450, 455/509–515
See application file for complete search history.

(56) References Cited

U.S. PATENT DOCUMENTS

| | | | |
|---|---|---|---|
| 6,487,184 B1 | 11/2002 | Pecen et al. | |
| 7,359,345 B2 | 4/2008 | Chang et al. | |
| 2002/0071480 A1* | 6/2002 | Marjelund et al. | 375/141 |
| 2002/0174332 A1* | 11/2002 | Vialen et al. | 713/152 |

(Continued)

FOREIGN PATENT DOCUMENTS

| | | |
|---|---|---|
| CN | 101064943 A | 10/2007 |
| JP | 11261470 A | 9/1999 |

(Continued)

OTHER PUBLICATIONS

Yi et al, Message Structure Based on the Allocation Method, U.S. Appl. No. 60/982,120, Oct. 23, 2007.*

(Continued)

*Primary Examiner* — Ricky Ngo
*Assistant Examiner* — Wei-Po Kao
(74) *Attorney, Agent, or Firm* — Liem T. Do

(57) ABSTRACT

Techniques for sending a message for random access by a user equipment (UE) are described. In an aspect, the UE may send the message on a control channel for random access and may send a reserved channel identifier to indicate the message being sent on the control channel. In another aspect, the UE may send the message in a protocol data unit (PDU) and may send additional information (e.g., a buffer status report) in the PDU if it can accommodate the additional information. In yet another aspect, the UE may generate a short message authentication code for integrity protection (MAC-I) for the message. The short MAC-I may have a smaller size and may be used to authenticate the UE. In yet another aspect, the UE may send a UE ID of one of multiple types for random access and may convey the UE ID type via a format field in the message.

20 Claims, 10 Drawing Sheets

(56) References Cited

U.S. PATENT DOCUMENTS

| | | | |
|---|---|---|---|
| 2003/0147371 A1* | 8/2003 | Choi et al. | 370/341 |
| 2004/0014452 A1 | 1/2004 | Lim et al. | |
| 2004/0146067 A1* | 7/2004 | Yi et al. | 370/474 |
| 2005/0186959 A1* | 8/2005 | Vialen et al. | 455/432.1 |
| 2006/0229091 A1 | 10/2006 | Rezaiifar et al. | |
| 2007/0161377 A1* | 7/2007 | Kodikara Patabandi et al. | 455/450 |
| 2008/0025314 A1* | 1/2008 | Lee et al. | 370/394 |
| 2008/0081613 A1* | 4/2008 | Yang et al. | 455/426.1 |
| 2009/0061878 A1* | 3/2009 | Fischer | 455/436 |
| 2009/0088195 A1* | 4/2009 | Rosa et al. | 455/507 |
| 2009/0104916 A1* | 4/2009 | Rosa et al. | 455/453 |
| 2009/0239545 A1* | 9/2009 | Lee et al. | 455/450 |
| 2010/0195640 A1* | 8/2010 | Park et al. | 370/350 |
| 2010/0226325 A1* | 9/2010 | Chun et al. | 370/329 |

FOREIGN PATENT DOCUMENTS

| | | |
|---|---|---|
| JP | 2003520517 A | 7/2003 |
| JP | 2007024098 A | 2/2007 |
| JP | 2009525644 A | 7/2009 |
| JP | 2010541464 A | 12/2010 |
| RU | 2232477 C2 | 7/2004 |
| RU | 2256299 C2 | 7/2005 |
| WO | WO-0152565 A2 | 7/2001 |
| WO | WO0165883 | 9/2001 |
| WO | WO03009612 A1 | 1/2003 |
| WO | WO2006121262 A2 | 11/2006 |
| WO | WO2007077250 A2 | 7/2007 |
| WO | WO2007083230 | 7/2007 |
| WO | WO-2007087842 A1 | 8/2007 |

OTHER PUBLICATIONS

Yi et al, Security Context Recovery in Communication, U.S. Appl. No. 60/983,304, Oct. 29, 2007.*

Yi et al, Timing Advance Stage 3 Issues, U.S. Appl. No. 60/975,819, Sep. 28, 2007.*

Yi et al, Handling of Correctly Receive But Decompression Failed Packets, U.S. Appl. No. 60/974,072, Sep. 20, 2007.*

3GPP TS 36.321 V8.0.0 (Dec. 2007), "3rd Generation Partnership Project; Technical Specification Group Radio Access Network; Evolved Universal Terrestrial, Radio Access (E-UTRA) Medium Access Control (MAC) protocol specification," Release 8.

LG Electronics Inc., Nokia Corporation, Nokia Siemens Networks, "Applicability for PDCP," 3GPP TSG RAN WG2 #60, Tdoc R2-075077, Jeju, South Korea, Nov. 5-9, 2007.

Qualcomm Europe, "Missing-frequency info in RRC Connection Re-establishment," 3GPP TSG-RAN WG 2 meeting #60-bis, R2-080360, Sevilla, Spain, Jan. 14-18, 2008.

3GPP : "3GPP 'TS 23.401 V8.0.0 (Dec. 2007) 3rd Generation Partnership Project; Technical Specification Group Services and System Aspects; General Packet Radio Service (GPRS) enhancements for Evolved Universal Terrestrial Radio Access Network (E-UTRAN) access (Release 8)" 3GPP, [Online Dec. 13, 2007, pp. 1-167, XP002538856 Retrieved from the Internet:URL: http://www. 3gpp.org/ftp/Specs/html-info/23401. htm>.

3GPP TS 36.321 v2.0.0 (Nov. 2007) 3rd Generation Partnership Project; Technical Specification Group Radio Access Network; Evolved Universal Terrestrial Radio Access (E-UTRA) Medium Access Control (MAC) protocol specification (Release 8) vol. 36.321, Nr:V2.0.0, pp. 1-23 XP002521802.

3GPP: "3GPP TS 36.213 v8.0.0 (Sep. 2007) 3rd Generation Partnership Project; Technical Specification Group Radio Access Network; Evolved Universal Terrestrial Radio Acess (E-UTRA); Physical layer procedures (Release 8)" 3GPP, [Online] Sep. 2007, pp. 1-13, XP002521804 Retrieved from the Internet:URL:http://www.3gpp.org/ftp/Specs/html-info/36213. htm>.

International Search Report and Written Opinion—PCT/US2008/087815—ISA/EPO—Aug. 6, 2009.

Soldani D Packet Data Transfer across EGPRS and WCDMA networks XP002521803 http://keskus.tct.hut.fi/opetus/s383215/2006/QoE3.pdf.

"Universal Mobile Telecommunications System (UMTS); 3G security; Security architecture (3GPP TS 33.102 version 7.1.0 Release 7); ETSI TS 133 102" ETSI Standards, Lis, Sophia Antipolis Cedex, France, vol. 3-SA3, No. V7.1.0, Dec. 1, 2006, XP014040243.

3GPP; Technical Specification Group Radio Access Network;: "TS 36.300 V8.2.0—Evolved Universal Terrestrial Radio Access (E-UTRA) and Evolved Universal Terrestrial Radio Access Network (E-UTRAN); Overall description; Stage 2" 3rd Generation Partnership Project; Technical Specification (TS), vol. 36.300, No. v8.2.0, Sep. 1, 2007, XP002595686.

Taiwan Search Report—TW097149940—TIPO—Jan. 1, 2012.

Taiwan Search Report—TW097149940—TIPO—Oct. 2, 2012.

LG Electronics Inc: "Discussion on MAC PDU over RACH", 3GPP TSG-RAN WG2 #60, R2-074985, Nov. 5-9, 2007.

LG Electronics Inc, "Discussion on RACH message 3", 3GPP TSG-RAN WG2 #60bis, R2-080383, Jan. 14-18, 2008, Seville, Spain.

Ericsson, "MAC Length field optimization", 3GPP TSG-RAN WG2 #59 Tdoc R2-073558, Athens, Greece, Aug. 20-24, 2007.

* cited by examiner

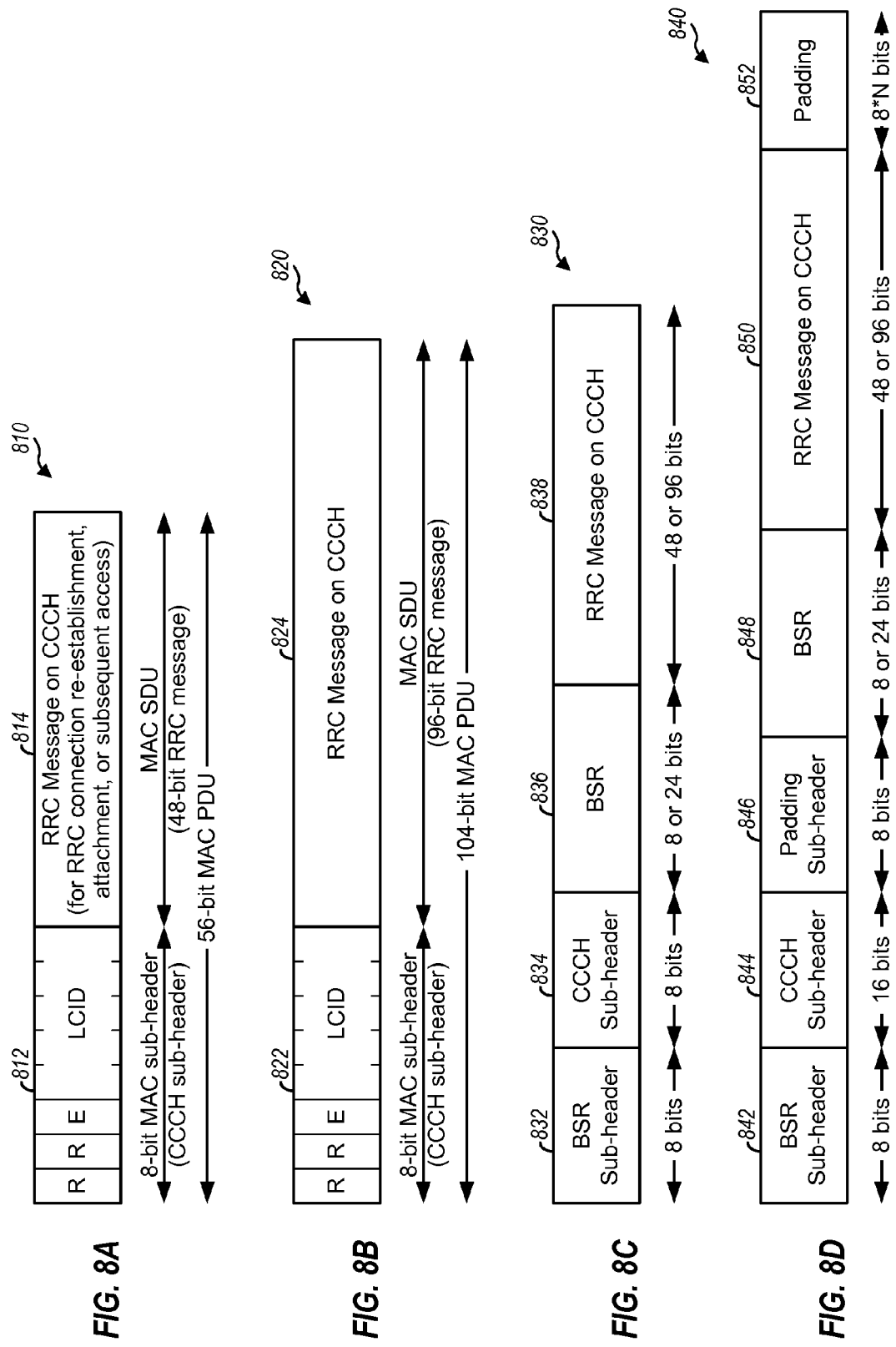

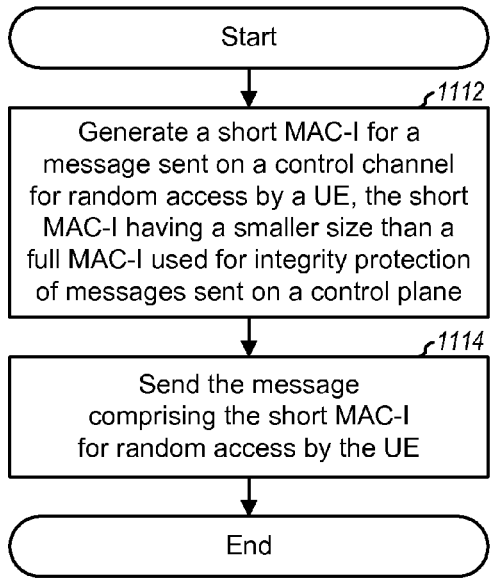
*FIG. 11*
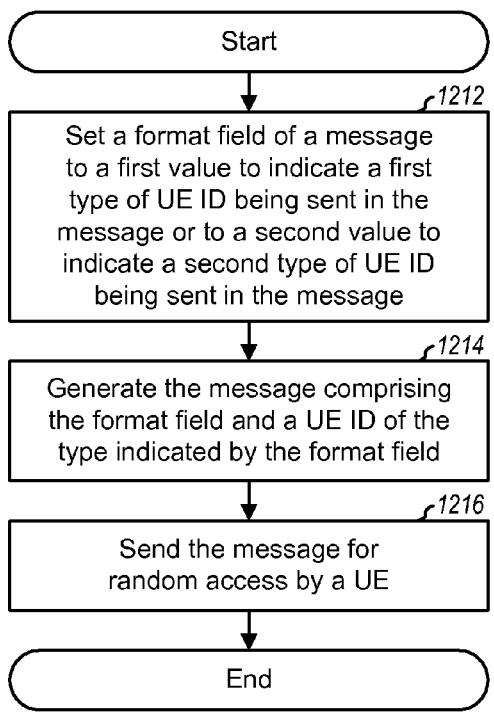
*FIG. 12*
*FIG. 13*

METHOD AND APPARATUS FOR TRANSFER OF A MESSAGE ON A COMMON CONTROL CHANNEL FOR RANDOM ACCESS IN A WIRELESS COMMUNICATION NETWORK

CLAIM OF PRIORITY UNDER 35 U.S.C. §119

The present application for patent claims priority to Provisional U.S. Application Ser. No. 61/015,159, entitled "METHODS AND APPARATUSES FOR TRANSFER OF FIRST SCHEDULED TRANSMISSION USING CONTROL CHANNEL," filed Dec. 19, 2007, assigned to the assignee hereof, and expressly incorporated herein by reference.

BACKGROUND

I. Field

The present disclosure relates generally to communication, and more specifically to techniques for performing random access in a wireless communication network.

II. Background

Wireless communication networks are widely deployed to provide various communication services such as voice, video, packet data, messaging, broadcast, etc. These networks may be multiple-access networks capable of supporting multiple users by sharing the available network resources. Examples of such multiple-access networks include Code Division Multiple Access (CDMA) networks, Time Division Multiple Access (TDMA) networks, Frequency Division Multiple Access (FDMA) networks, Orthogonal FDMA (OFDMA) networks, and Single-Carrier FDMA (SC-FDMA) networks.

A wireless communication network may include a number of base station that can support communication for a number of user equipments (UEs). A UE may perform random access in order to establish a connection with a base station. The UE may send pertinent information used to establish the connection. It is desirable to efficiently send the information during random access.

SUMMARY

Techniques for sending a message for random access by a UE are described herein. In an aspect, a reserved channel identifier may be used to indicate a message being sent on a control channel for random access. In one design, a UE may send a message on a control channel for random access and may also send a reserved channel identifier to indicate the message being sent on the control channel. The message sent on the control channel may comprise a Radio Resource Control (RRC) message sent on a common control channel (CCCH), which may be mapped to an uplink shared channel (UL-SCH). The reserved channel identifier may comprise a reserved logical channel identifier (LCID).

In another aspect, a message and additional information may be sent for random access. In one design, a UE may send a message in a protocol data unit (PDU), with the message being sent on a control channel for random access by the UE. The UE may send additional information in the PDU if the PDU can accommodate the additional information. The additional information may comprise a buffer status report for the UE, a power headroom report for the UE, data for a dedicated control channel, data for a dedicated traffic channel, etc. The PDU may have a variable size determined based on an uplink grant for the UE.

In yet another aspect, a short message authentication code for integrity protection (MAC-I) may be sent in a message for random access. In one design, a UE may generate a short MAC-I for a message sent on a control channel for random access. The short MAC-I may have a smaller size than a full MAC-I used for integrity protection of messages sent on a control plane. The short MAC-I may be for an RRC message sent on the CCCH for RRC connection re-establishment and may be used to authenticate the UE.

In yet another aspect, a UE ID of one of multiple types may be sent for random access. In one design, a UE may set a format field of a message to a first value to indicate a first type of UE ID being sent in the message (e.g., for attachment) or to a second value to indicate a second type of UE ID being sent in the message (e.g., for subsequent access). The UE may generate the message comprising the format field and a UE ID of the type indicated by the format field. The UE may send the message for random access.

Various aspects and features of the disclosure are described in further detail below.

BRIEF DESCRIPTION OF THE DRAWINGS

FIGS. 8A to 8D show four MAC PDUs carrying a message for random access.

FIG. 11 shows a process for sending a message with a short MAC-I for random access.

FIG. 12 shows a process for sending a UE ID for random access.

FIG. 13 shows a process for sending a message for random access.

DETAILED DESCRIPTION

The techniques described herein may be used for various wireless communication networks such as CDMA, TDMA, FDMA, OFDMA, SC-FDMA and other networks. The terms "network" and "system" are often used interchangeably. A CDMA network may implement a radio technology such as Universal Terrestrial Radio Access (UTRA), cdma2000, etc. UTRA includes Wideband CDMA (WCDMA) and other variants of CDMA. cdma2000 covers IS-2000, IS-95 and IS-856 standards. A TDMA network may implement a radio technology such as Global System for Mobile Communications (GSM). An OFDMA network may implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDM®, etc. E-UTRA employs OFDMA on the downlink and SC-FDMA on the uplink. 3GPP Long Term Evolution (LTE) utilizes an air interface defined by E-UTRA and a network architecture defined by an E-UTRAN. UTRA, E-UTRA, E-UTRAN, LTE and GSM are described in documents from an organization named "3rd Generation Partnership Project" (3GPP). cdma2000 and UMB are described in documents from an organization named "3rd Generation Partnership Project 2" (3GPP2). For clarity, certain aspects of the techniques are described below for LTE, and LTE terminology is used in much of the description below.

Figure 1:
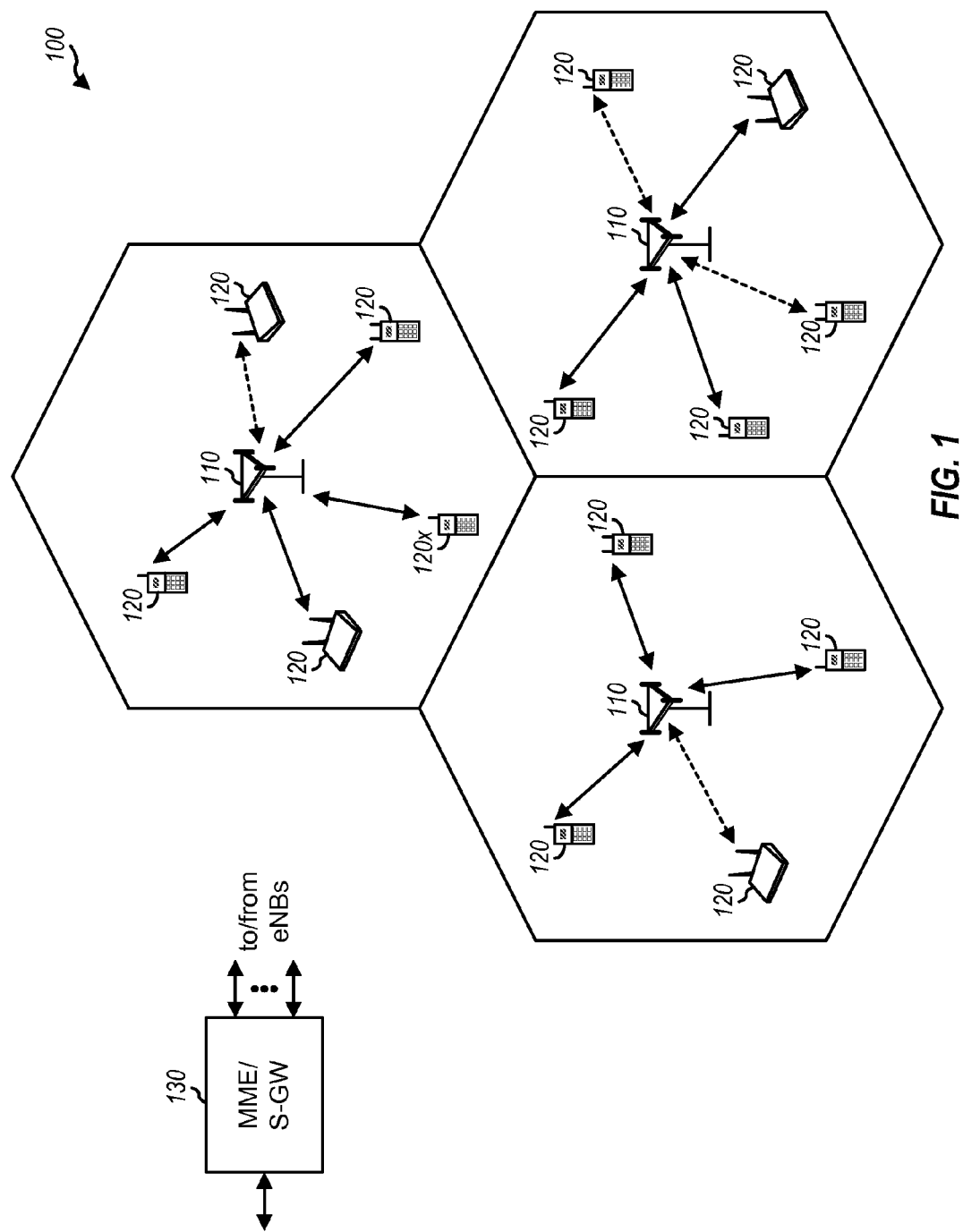
FIG. 1 shows a wireless communication network.

FIG. 1 shows a wireless communication network 100, which may be an LTE network. Network 100 may include evolved Node Bs (eNBs) 110 and other network entities described by 3GPP. An eNB may be a fixed station that communicates with the UEs and may also be referred to as a Node B, a base station, an access point, etc. Each eNB may provide communication coverage for a particular geographic area. To improve network capacity, the overall coverage area of an eNB may be partitioned into multiple (e.g., three) smaller areas. Each smaller area may be served by a respective eNB subsystem. In 3GPP, the term "cell" can refer to the smallest coverage area of an eNB and/or an eNB subsystem serving this coverage area.

A Mobility Management Entity (MME)/Serving Gateway (S-GW) 130 may couple to a set of eNBs and provide coordination and control for these eNBs. Serving gateway 130 may support data services such as packet data, Voice-over-Internet Protocol (VoIP), video, messaging, etc. MME 130 may be responsible for path switching between a source eNB and a target eNB at handover. MME/serving gateway 130 may couple to a core and/or data network (e.g., the Internet) and may communicate with other entities (e.g., remote servers and terminals) coupled to the core/data network.

UEs 120 may be dispersed throughout the network, and each UE may be stationary or mobile. A UE may also be referred to as a mobile station, a terminal, an access terminal, a subscriber unit, a station, etc. A UE may be a cellular phone, a personal digital assistant (PDA), a wireless modem, a wireless communication device, a handheld device, a laptop computer, a cordless phone, a wireless local loop (WLL) station, etc. A UE may communicate with an eNB via the downlink and uplink. The downlink (or forward link) refers to the communication link from the eNB to the UE, and the uplink (or reverse link) refers to the communication link from the UE to the eNB. In FIG. 1, a solid line with double arrows indicates active communication between an eNB and a UE. A dashed line with double arrows indicates a UE performing random access.

Figure 2:
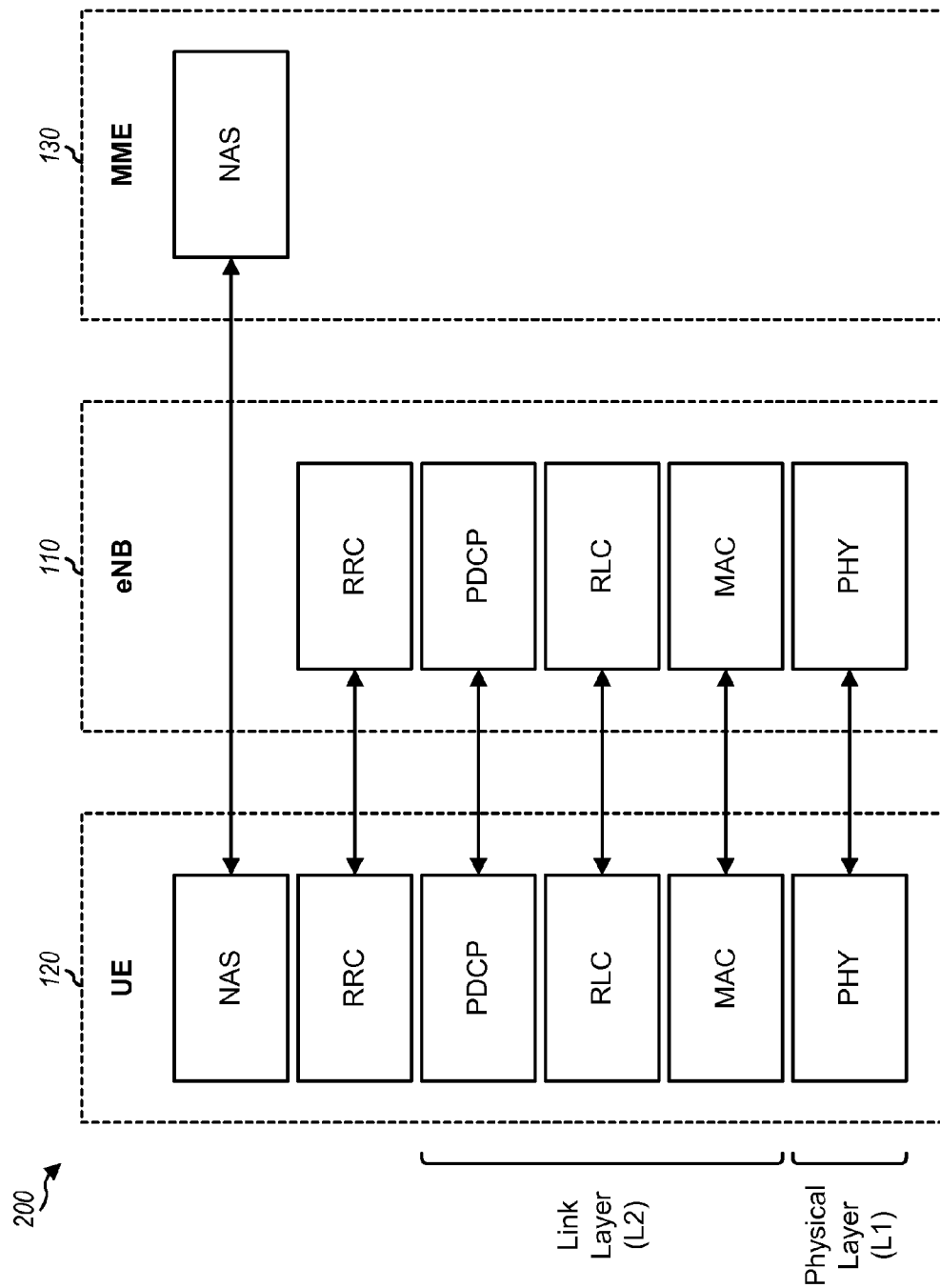
FIG. 2 shows protocol stacks for a control plane in Long Term Evolution (LTE).

FIG. 2 shows example protocol stacks 200 for a control plane in LTE. The control plane carries signaling between a UE 120 and MME 130 via an eNB 110. UE 120 may communication with MME 130 via a Non-Access Stratum (NAS) control protocol. NAS may perform various functions such as Evolved Packet System (EPS) bearer management, authentication, mobility handling, paging origination, security control, etc. UE 120 may exchange signaling messages with eNB 110 via Radio Resource Control (RRC). RRC may perform functions such as RRC connection management, UE measurement reporting and control, radio bearer (RB) control, mobility functions, broadcast, paging, etc.

RRC messages may be exchanged between UE 120 and eNB 110 via Packet Data Convergence Protocol (PDCP), Radio Link Control (RLC), and Medium Access Control (MAC), which are sublayers of Layer 2 (L2). Each protocol receives service data units (SDUs) from a higher sublayer/layer and provides protocol data units (PDUs) to a lower sublayer/layer. PDCP may perform various functions such as ciphering (i.e., encryption) and integrity protection for control plane, ciphering and header compression for user plane, etc. RLC may perform various functions such as (i) segmentation and concatenation of RLC SDUs and error correction through Automatic Repeat reQuest (ARQ) at a transmitting entity and (ii) duplicate detection of lower layer SDUs, re-ordering of RLC SDUs, and in-order delivery of upper layer PDUs at a receiving entity. MAC may perform various functions such as mapping between logical channels and transport channels, multiplexing and demultiplexing of RLC PDUs for logical channels into/from transport blocks for transport channels, traffic volume measurement reporting, error correction through Hybrid ARQ (HARQ), priority handling between logical channels of a UE, priority handling between UEs via dynamic scheduling, transport format selection, padding, etc. The functions performed by RRC, PDCP, RLC and MAC in LTE may be provided by equivalent protocols in other radio technologies. UE 120 further communicates with eNB 110 via E-UTRA air-link interface at the physical layer (PHY).

MAC may provide data transfer services via logical channels. A set of logical channels may be defined for different data transfer services offered by MAC. MAC may also utilize a set of transport channels to carry data for the logical channels. The logical channels may be characterized by what is transported whereas the transport channels may be characterized by how and with what characteristics user data and control data are transferred over a radio interface. The logical channels may be mapped to transport channels, which may further be mapped to physical channels.

Table 1 lists some logical and transport channels in LTE. LTE supports other logical and transport channels that are not shown in Table 1 for simplicity.

TABLE 1

Logical and Transport Channels in LTE

| Type | Channel | Channel Name | Description |
| --- | --- | --- | --- |
| Logical | CCCH | Common Control Channel | Carry control data to/from a UE not known to the network. |
| Logical | DCCH | Dedicated Control Channel | Carry control data to/from a UE known to the network. |
| Logical | DTCH | Dedicated Traffic Channel | Carry user data to/from a UE. |
| Transport | RACH | Random Access Channel | Carry random access preambles on uplink from a UE. |
| Transport | UL-SCH | Uplink Shared Channel | Carry user data and control data on uplink from a UE. |
| Transport | DL-SCH | Downlink Shared Channel | Carry user data and control data on downlink to a UE. |

Figure 3:
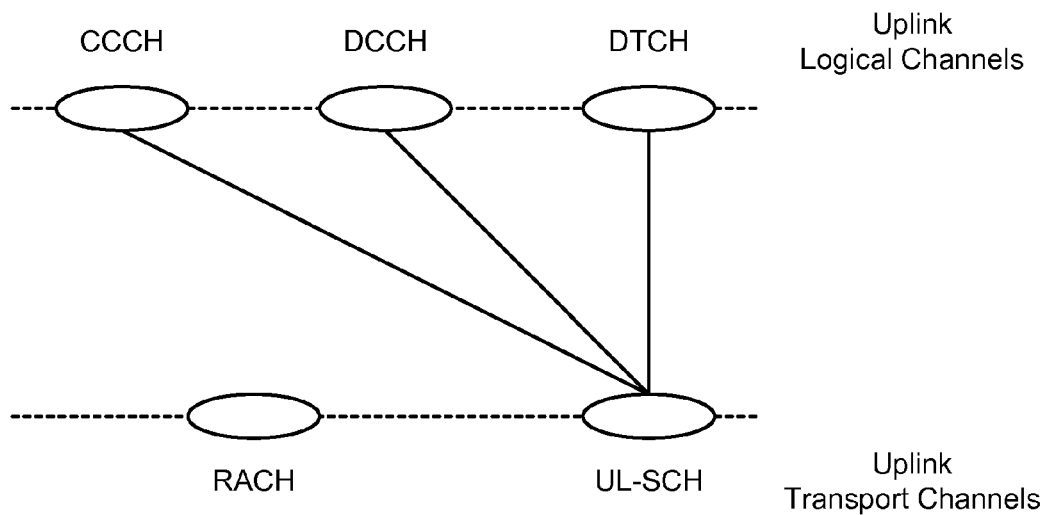
FIG. 3 shows mapping of logical channels to transport channels for the uplink.

FIG. 3 shows a mapping of some logical channels to transport channels for the uplink in LTE. On the uplink, the CCCH, DCCH and DTCH may be mapped to the UL-SCH. A UE may use the CCCH when the network does not know the identity of the UE and may use the DCCH when the network knows the identity of the UE. On the downlink, the CCCH may be mapped to the DL-SCH (not shown in FIG. 3).

A UE may perform a random access procedure in order to access the network and/or for other purposes. The terms "random access", "system access", and "access" may be used interchangeably. For example, the UE may perform the random access procedure for the following random access scenarios:

RRC connection re-establishment,

Attachment to the network, e.g., based on an International Mobile Subscriber Identity (IMSI), or Subsequent access to the network for transition from an Idle mode to an Active mode, e.g., based on an EPS Temporary Mobile Subscriber Identity (S-TMSI).

The UE may also perform the random access procedure for handover access when the UE is handed over from one eNB to another eNB. The UE may also perform the random access procedure for other scenarios. The UE may use the CCCH for RRC connection re-establishment, attachment, and subsequent access.

Figure 4:
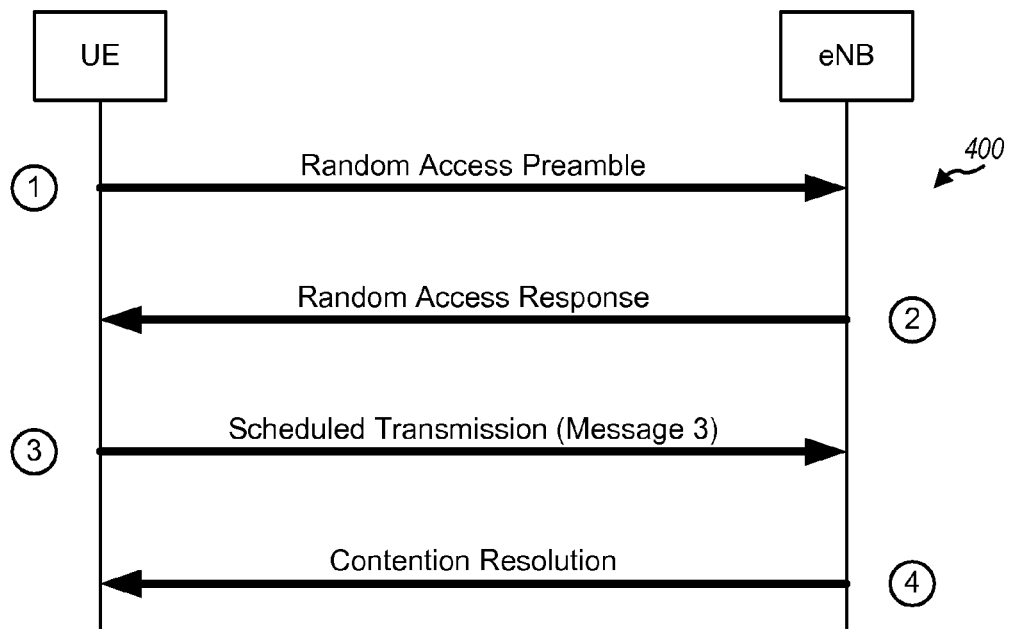
FIG. 4 shows a message flow for a random access procedure in LTE.

FIG. 4 shows a message flow 400 for the random access procedure in LTE. A UE may transmit a random access (RA) preamble on the RACH whenever the UE desires to access the network and resources are available (step 1). The RA preamble may also be referred to as Message 1. The RA preamble may be identified by an RA preamble identifier (ID) used as a temporary ID for the UE during the random access procedure. An eNB may receive the RA preamble from the UE and possibly RA preambles from other UEs. The eNB may send a random access response on the DL-SCH to respond to one or more RA preambles (step 2). The random access response may also be referred to as Message 2 and may include various types of information such as the RA preamble ID, timing alignment information, an initial uplink grant, an assignment of a temporary UE ID, etc.

The UE may receive the random access response from the eNB and may send a first scheduled transmission on the UL-SCH. The first scheduled transmission may also be referred to as Message 3 and may include different information for different types of random access, as described below. The size of the first scheduled transmission may be dependent on the uplink grant conveyed in Message 2. The eNB may receive the first scheduled transmission and may send a message on the DL-SCH for contention resolution, if necessary (step 4). A collision may occur when multiple UEs send the same RA preamble on the RACH. Contention resolution may be performed to resolve which UE is granted access.

The random access procedure for LTE is described in 3GPP TS 36.213, TS 36.300, TS 36.321 and TS 36.331, which are publicly available.

The first scheduled transmission in step 3 is referred to as Message 3 in most of the description below. Table 2 lists different types of information that may be sent in Message 3 for different random access scenarios/types, in accordance with one design. IMSI is a UE identity (ID) that is globally unique. S-TMSI is a UE ID that is unique within a network. Cell Radio Network Temporary Identifier (C-RNTI) is a UE ID that is unique within a cell. The different types of UE IDs may be applicable for different areas and may have different lengths. MAC-I is a Message Authentication Code for Integrity protection and may be used to authenticate the sender of a message. Table 2 also gives the number of bits for each type of information in accordance with one design. Other types of information may also be sent for each random access type.

TABLE 2

Initial bit counts for Message 3

| | Random Access Type | | |
|---|---|---|---|
| Layer | RRC Connection Re-establishment | Attachment | Subsequent Access |
| RRC | Old cell ID: 9 bits, Old C-RNTI: 16 bits, MAC-I: 32 bits, Frequency info: 14 bits | Initial UE identity (IMSI): 84 bits Establishment cause: 3 bits | Initial UE identity (S-TMSI): 40 bits Establishment cause: 3 bits |
| PDCP | PDCP without MAC-I: 8 bits | | |
| RLC | RLC-TM: 0 bit | | |
| MAC | MAC header: 16 bits | | |
| PHY | Physical layer CRC: 24 bits | | |
| RRC bits | 71 | 87 | 43 |
| Other bits | 48 | 48 | 48 |
| Total bits | 119 | 135 | 91 |

The UE may be allocated an uplink grant for sending Message 3. In one design, the uplink grant may be at least 80 bits and may be given in multiple of 8 bits, e.g., 80 bits, 88 bits, 96 bits, etc. The minimum uplink grant of 80 bits may be selected based on various factors such as the amount of information to send in Message 3, the desired performance at cell edge, etc. Fewer bits (e.g., 72 bits) or more bits may also be supported for the minimum uplink grant.

As shown in Table 2, the total number of bits for Message 3 for each random access type exceeds the minimum uplink grant of 80 bits. It may be desirable to reduce the total number of bits for Message 3 so that Message 3 can be sent with the minimum uplink grant. It may also be desirable to define a single format for PDCP, RLC and MAC for Message 3. The total number of bits for Message 3 may be reduced as described below.

For RRC, one of a limited number of RRC message sizes may be supported for an RRC message sent on the CCCH for Message 3. In one design, RRC message sizes of 48 bits and 96 bits may be supported. A 48-bit RRC message or a 96-bit RRC message may be sent in Message 3 depending on the uplink grant size.

For RRC connection re-establishment, Message 3 may comprise an RRC Connection Re-establishment Request message or some other RRC message. In one design, the number of bits for the RRC message for RRC connection re-establishment may be reduced by omitting the 32-bit MAC-I as well as the frequency information. MAC-I may be used to verify a UE sending the RRC message and may act as a trigger for switching an S1 data path for the UE on the network side. The omission of MAC-I from the RRC Connection Re-establishment Request message may delay the path switching until an RRC Connection Reconfiguration Complete message (which may be integrity protected) is sent by the UE in an RRC connection re-establishment procedure. In another design, a short MAC-I of a smaller size may be generated and sent in the RRC message. For example, a 16-bit short MAC-I may be generated based on 16 most significant bits (MSBs) of a full MAC-I and may be sent in the RRC message. In yet another design, a short MAC-I may have a variable size, which may be dependent on the uplink grant size. For all designs, a 48-bit RRC message may be sent for RRC connection re-establishment and may be filled with a sufficient number of padding bits, if needed.

For attachment, Message 3 may comprise an RRC Connection Request message or some other RRC message. In one design, the size of an initial UE ID (e.g., an IMSI) may be reduced, if needed, so that the RRC message can fit one of the supported RRC message sizes. An IMSI may be composed of a 3-digit mobile country code (MCC), a 2-digit or 3-digit mobile network code (MNC), and a mobile station identification number (MSIN) that is unique within a network. An IMSI may have a length of between 6 and 21 decimal digits, and 15 digits may be the typical length of the IMSI in LTE.

In one design, the IMSI may be conveyed using binary representation (instead of hexadecimal representation) in order to increase the amount of IMSI information that can be sent in an RRC message of a given size. Each decimal digit of the IMSI may be conveyed with one 4-bit hexadecimal (e.g., as in UTRAN). A 21-digit IMSI may be conveyed with 84 bits using hexadecimal representation or 70 bits using binary representation.

In one design, a predetermined number of least significant bits (LSBs) of the IMSI may be sent in a fixed size field of an RRC message. For example, a partial UE ID may be formed with 44 LSBs of the IMSI and may be sent in a 48-bit RRC message. Although the IMSI is globally unique for each UE, using a portion of the IMSI introduces a (very low) probability of collisions due to multiple UEs having globally unique IMSIs but potentially the same partial IMSI. Since the MCC and MNC are typically the same in a given network, using the LSBs of the IMSI may reduce the likelihood of collision. It may not be feasible to detect and resolve collision of partial IMSIs at the radio level. Instead, a failure of an upper layer procedure (e.g., an authentication challenge) may be used to detect and resolve collision of partial IMSIs.

A partial IMSI may be composed of a portion of an IMSI and may be conveyed using binary representation. For example, 13 least significant digits of the IMSI may be conveyed with 44 bits using binary representation versus 52 bits using hexadecimal representation. A 44-bit partial IMSI may be sent in a 48-bit RRC message. If the IMSI is shorter than 13 digits, then the RRC message may be padded with zeros. The RRC message may include a 1-bit Format field that may be set to '0' to indicate a 43-bit partial IMSI or to '1' to indicate a full IMSI.

In another design, a variable amount of UE ID information may be sent in the RRC message depending on the uplink grant size. A UE may be allocated the minimum uplink grant in rare bad situation and may send the minimum number of bits for the IMSI. The UE may be allocated more than the minimum uplink grant in most situations and may be able to send more bits of the IMSI in the RRC message when allowed by the larger uplink grant. In one design, the 1-bit Format field of the RRC message may be set to '1' to indicate a variable size RRC message or to '0' to indicate a predetermined sized RRC message. The variable size RRC message may include an IMSI length field and an IMSI field. The IMSI length field may indicate the length of the IMSI field, which may carry a partial or full IMSI. MAC may receive an uplink grant for the UE and may convey the uplink grant size to RRC. RRC may then include as many IMSI digits or bits as possible in the RRC message.

Table 3 lists different types of information that may be sent on the CCCH for Message 3 for different random access types, in accordance with one design. Table 3 assumes a minimum uplink grant of 80 bits. Information for RRC may be reduced as described above. For RRC connection re-establishment, an RRC Connection Re-establishment Request message may include an old cell ID (9 bits), an old C-RNTI (16 bits), a short MAC-I, and padding and/or reserved bits for the minimum uplink grant. The RRC message may include a 16-bit MAC-I and 7 padding bits (as shown in Table 3), or a 23-bit MAC-I and no padding bits, or some other combination of MAC-I bits and padding bits. The RRC message may also include a larger MAC-I (e.g., a 32-bit full MAC-I normally generated by PDCP for messages on the control plane) for a larger uplink grant. The short MAC-I may have a variable size determined based on the uplink grant for the UE. For attachment, an RRC Connection Request message may include (i) a partial 44-bit IMSI when the Format field is set to '0' or (ii) an IMSI of a variable length (e.g., in multiple of 8 bits and up to a maximum of 96 bits) when the Format field is set to '1'. Information for PDCP and MAC may be reduced as described below.

TABLE 3

Revised bit counts for first scheduled transmission (Message 3)

| | Random Access Type | | |
|---|---|---|---|
| Layer | RRC Connection Re-establishment | Attachment | Subsequent Access |
| RRC | Old cell ID: 9 bits, Old C-RNTI: 16 bits, MAC-I: 16 bits Padding: 7 bits | Format: 1 bit Initial UE identity (IMSI): 44 bits when Format bit set to '0' Establishment cause: 3 bits | Format: 1 bit Initial UE identity (S-TMSI): 40 bits Establishment cause: 3 bits Padding: 4 bits |
| PDCP | PDCP transparent operation: 0 bits | | |
| RLC | RLC-TM: 0 bit | | |
| MAC | MAC header: 8 bits | | |
| PHY | Physical layer CRC: 24 bits | | |
| RRC bits | 48 | 48 | 48 |
| Other bits | 24 | 24 | 24 |
| Total bits | 80 | 80 | 80 |

In another design not shown in Table 3, a random ID may be sent instead of a partial IMSI for attachment. The random ID may be a pseudo-random value selected by the UE, a hash value generated by hashing the IMSI or some other UE ID, or a value obtained in other manners. The random ID may have a fixed size (e.g., 40 bits to match the size of the S-TMSI) or a variable size (e.g., dependent the uplink grant size).

In another design, the Format field may indicate one of multiple types of UE ID being sent in an RRC message. For example, the Format field may be set (i) to '0' to indicate an S-TMSI being sent in the RRC message for subsequent access or (ii) to '1' to indicate a partial IMSI or a random ID being sent in the RRC message for attachment.

Figure 5:
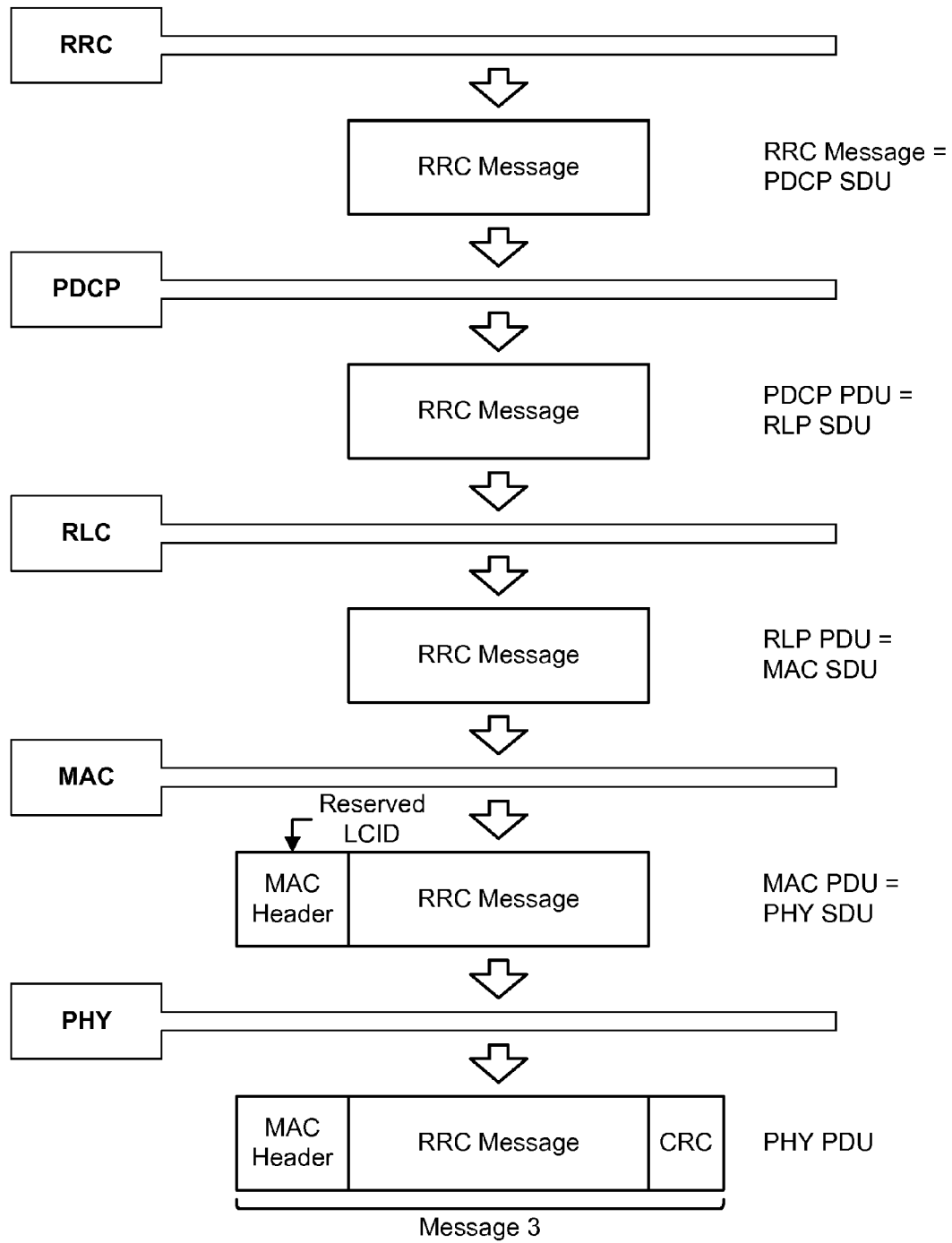
FIG. 5 shows processing to generate Message 3 in the random access procedure.

FIG. 5 shows a design of processing to generate Message 3 in LTE. Message 3 may include all of the information for RRC shown in Table 3. In one design, Message 3 may have a fixed length (e.g., 80 bits) for all random access types. In another design, Message 3 may have different lengths for different random access types, different uplink grant sizes, etc.

In one design, a transparent mode of operation may be defined for PDCP to support transfer of an RRC message on the CCCH for random access. In the transparent mode, PDCP may neither perform integrity protection nor ciphering for the CCCH carrying the RRC message, and a PDCP header may be omitted in the transfer of the CCCH. PDCP may be informed to operate in the transparent mode and may then perform no operation for the CCCH. PDCP may receive the RRC message as a PDCP SDU and may provide this RRC message as a PDCP PDU. Alternatively, RRC may pass the RRC message directly to RLC, and PDCP may be bypassed altogether for transfer of the RRC message on the CCCH. In any case, omitting the PDCP header may save 8 bits and may allow the size of Message 3 to be reduced to 80 bits, as shown in Table 3.

RLC may operate in a transparent mode (TM) for the CCCH. In this case, RLC may receive the PDCP PDU as an RLC SDU and may simply pass the PDCP SDU as an RLC PDU.

MAC may receive the RLC PDU as a MAC SDU and may also receive an indication of the MAC SDU comprising an RRC message sent on the CCCH. MAC may generate a MAC PDU containing a MAC header and a MAC payload. The MAC header may have the format described below. The MAC payload may include (i) the MAC SDU carrying the RRC message and (ii) possibly other information and/or padding. The physical layer may generate a 24-bit cyclic redundancy check (CRC) for the MAC PDU, append the CRC to the MAC PDU, and provide a PHY PDU. The PHY PDU may be sent as Message 3.

Figure 6:
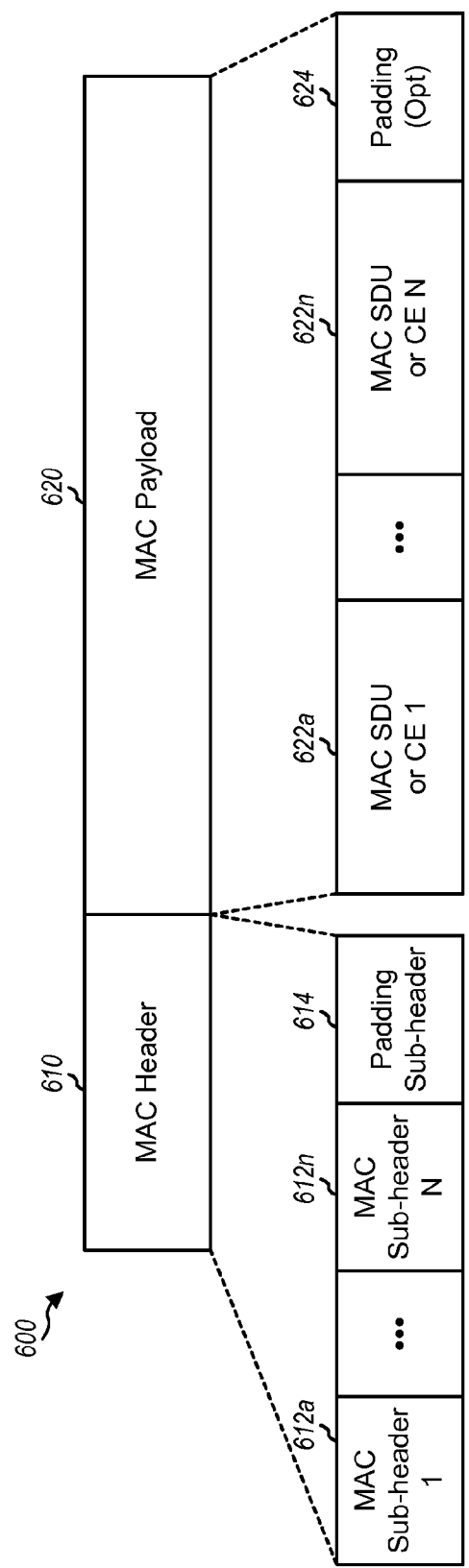
FIG. 6 shows a Medium Access Control (MAC) PDU for Message 3.

FIG. 6 shows a design of a MAC PDU 600 that may be used for Message 3. MAC PDU 600 includes a MAC header 610 and a MAC payload 620. MAC header 610 includes N MAC sub-headers 612a through 612n, where N may be an integer value of one or greater. Each MAC sub-header 612 may have a format described below. MAC header 610 may also include a padding sub-header 614 if MAC payload 620 includes a padding field 624. MAC payload 620 includes N MAC payload units 622a through 622n. Each MAC payload unit 622 may be a MAC control element (CE) or a MAC SDU. The n-th MAC sub-header 612 is associated with the n-th MAC payload unit 622, where 1≤n≤N.

Figure 7A:
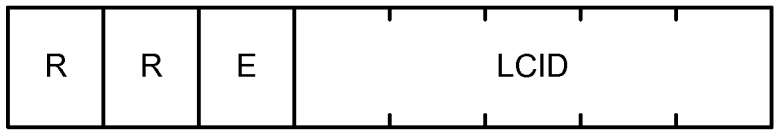
FIGS. 7A to 7C show three MAC sub-headers.

FIG. 7A shows an 8-bit MAC sub-header 710 that may be used for a MAC SDU for Message 3. In this design, MAC sub-header 710 includes an R/R/E/LCID sub-header composed of two 1-bit reserved (R) fields, a 1-bit extension (E) field, and a 5-bit logical channel ID (LCID) field. The reserved fields are reserved for future use. The extension field indicates whether another MAC sub-header will follow in the MAC header. The LCID field carries an LCID of a logical channel having its data sent in the associated MAC SDU. Data for one or more logical channels may be sent in a stream of MAC SDUs. Each logical channel may be assigned a different LCID. A MAC PDU may carry (i) the LCID of a logical channel in the LCID field of a MAC sub-header and (ii) data for the logical channel in a MAC SDU.

In one design, a specific LCID may be reserved and used to indicate that a MAC SDU carries an RRC message sent on the CCCH for Message 3. In one design, the reserved LCID has a value of '00000' (binary). Other values may also be used for the reserved LCID. A UE may send an RRC message on the CCCH for any of the random access types shown in Table 2 or on the DCCH for handover access. The reserved LCID may allow MAC at the UE to process the CCCH for Message 3 in the same manner as for other logical channels mapped to the UL-SCH, which may simplify processing at the UE. The reserved LCID may also allow an eNB to distinguish between data for the CCCH and data for other logical channels.

MAC sub-header 710 does not include a length field. MAC sub-header 710 may be used for a fixed length MAC SDU and also for the last MAC sub-header in a MAC header, e.g., for MAC sub-header 612n in FIG. 6, with padding sub-header 614 not present.

Figure 7B:
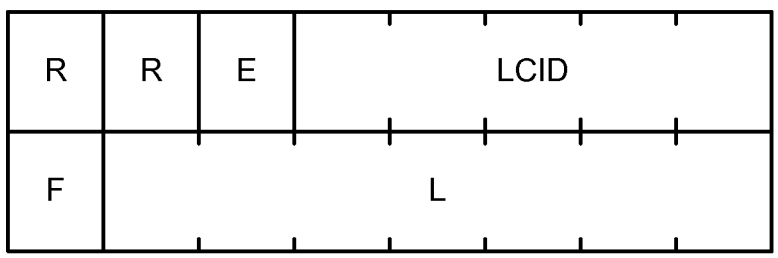

FIG. 7B shows a 16-bit MAC sub-header 720 that may be used for a MAC SDU. MAC sub-header 720 includes an R/R/E/LCID/F/L sub-header composed of two 1-bit reserved fields, a 1-bit extension field, a 5-bit LCID field, a 1-bit format (F) field, and a 7-bit length (L) field. The format field is set to '0' when the 7-bit length field is used. The length field indicates the length of the MAC SDU in units of octets.

Figure 7C:
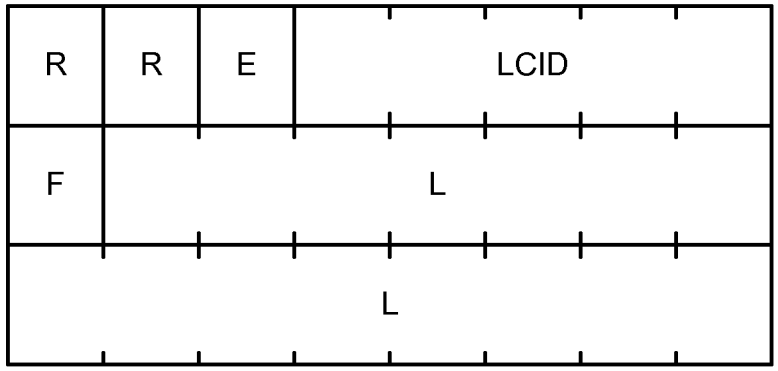

FIG. 7C shows a 24-bit MAC sub-header 730 that may also be used for a MAC SDU. MAC sub-header 730 includes an R/R/E/LCID/F/L sub-header composed of two 1-bit reserved fields, a 1-bit extension field, a 5-bit LCID field, a 1-bit format field, and a 15-bit length field. The format field is set to '1' when the 15-bit length field is used. MAC sub-header 730 may be used for a large MAC SDU with more than 127 octets.

In the design shown in FIG. 7A, the length field may be omitted from MAC sub-header 710. Padding at a transmitting entity and de-padding at a receiving entity may be performed in various manners without the length field. In one design, MAC and/or RRC at the transmitting entity may add padding bits without any indication in a MAC sub-header. De-padding may be implicit in MAC and/or RRC at the receiving entity. An uplink grant sent in Message 2 may be determined by MAC and may have a variable size. In this case, padding may be part of scheduling operation in MAC at the transmitting entity. At the receiving entity, MAC may simply pass a MAC SDU for CCCH up to RRC, and RRC may read only information elements in the MAC SDU and may ignore the padding.

In another design, MAC header 610 in FIG. 6 may include a flag that may indicate whether or not MAC payload 620 is carrying the CCCH. The flag may be present in the MAC header for all MAC PDUs and would then represent overhead for all data including user data.

In one design, 8-bit MAC sub-header 710 may be used for a MAC SDU carrying an RRC message sent on the CCCH, e.g., whenever possible in order to reduce overhead. In one design, 16-bit MAC sub-header 720 may be used for a MAC SDU carrying an RRC message sent on the CCCH, when required (e.g., due to the presence of padding) or if appropriate (e.g., to fill the MAC payload). Padding may be performed by MAC with an existing MAC sub-header for padding, which is referred to as a padding sub-header.

MAC may be responsible for packing a transport block and generating a MAC PDU composed of a MAC header and a MAC payload. MAC may send a MAC SDU carrying an RRC message in the MAC payload. If the uplink grant is sufficiently large, then MAC may also generate a MAC CE for a buffer status report (BSR) or a power headroom report (PHR) and may send this MAC CE in the MAC payload. If the uplink grant is larger than the MAC SDU and the MAC CE, then the remaining space in the MAC payload may be padded (instead of being filled with user data). Ciphering of user data may not be available at this stage of the random access procedure, and it may be desirable to not send user data in the MAC payload. An RRC message and possibly other information may be sent in a MAC PDU using various formats.

FIG. 8A shows a design of a MAC PDU 810 carrying an RRC message on the CCCH for a minimum uplink grant of 80 bits. MAC PDU 810 includes a MAC sub-header 812 and a MAC SDU 814. MAC sub-header 812 may be 8-bit MAC sub-header 710 shown in FIG. 7A and may be referred to as a CCCH sub-header. The LCID field of MAC sub-header 812 may carry the reserved LCID to indicate that MAC SDU 814 carries an RRC message sent on the CCCH. MAC SDU 814 may carry a 48-bit RRC message sent on the CCCH for RRC connection re-establishment, attachment, or subsequent access. The RRC message may include the information shown in Table 3. Message 3 may include 56 bits for MAC PDU 810 plus 24 bits for CRC.

FIG. 8B shows a design of a MAC PDU 820 carrying an RRC message for a larger uplink grant of 128 bits. MAC PDU 820 includes a MAC sub-header 822 for CCCH (or a CCCH sub-header) and a MAC SDU 824. MAC sub-header 822 may be 8-bit MAC sub-header 710 with the LCID field carrying the reserved LCID. MAC SDU 824 may carry a 96-bit RRC message sent on the CCCH for any of the random access types listed in Table 3. The larger RRC message may carry a full IMSI for attachment and/or other information.

FIG. 8C shows a design of a MAC PDU 830 carrying an RRC message and other information. MAC PDU 830 includes a MAC sub-header 832 for BSR (or a BSR sub-header), a MAC sub-header 834 for CCCH, a BSR MAC CE 836, and a MAC SDU 838. BSR sub-header 832 may be a MAC sub-header that indicates the presence of BSR MAC CE 836 in the MAC PDU. MAC sub-header 834 may be 8-bit MAC sub-header 710 with the LCID field carrying the reserved LCID. BSR MAC CE 836 may carry a buffer status report (of 1 or 3 bytes in size) and may be included in the MAC PDU when the uplink grant is larger than the size of the RRC message. MAC SDU 838 may carry a 48-bit or 96-bit RRC message sent on the CCCH for any of the random access types listed in Table 3.

FIG. 8D shows a design of a MAC PDU 840 carrying an RRC message, other information, and padding. MAC PDU 840 includes a BSR sub-header 842, a MAC sub-header 844 for CCCH, a padding sub-header 846, a BSR MAC CE 848, a MAC SDU 850, and a padding field 852. BSR sub-header 842 may indicate the presence of BSR MAC CE 848 in the MAC PDU. MAC sub-header 844 may be 16-bit MAC sub-header 720 in FIG. 7B and may have (i) the LCID field carrying the reserved LCID and (ii) the length field indicating the length of MAC SDU 850. Padding sub-header 846 may indicate the presence of padding field 852 in the MAC PDU. BSR MAC CE 848 may carry an 8-bit or 24-bit buffer status report. MAC SDU 850 may carry a 48-bit or 96-bit RRC message sent on the CCCH for any of the random access types listed in Table 3. Padding field 852 may include a sufficient number of padding bits to fill the MAC PDU.

FIGS. 8A to 8D show four example designs of MAC PDUs carrying an RRC message sent on the CCCH for different uplink grant sizes. In general, a MAC PDU may carry an RRC message and possibly other information using any format. The other information may comprise a buffer status report, a power headroom report indicating how much power headroom the UE has for uplink transmission, data for the DCCH, data for the DTCH, etc. An RRC message may have a variable size (e.g., of 48 or 96 bits) or a fixed size (e.g., of 48 bits) and may be sent in a MAC SDU. A buffer status report or a power headroom report (e.g., of 8 bits, 24 bits, or some other size) may be sent in a MAC CE. Other MAC control elements may also be sent in the MAC PDU for random access.

Table 4 lists the content of a MAC PDU for the designs shown in FIGS. 8A to 8D for different uplink grant sizes. For each uplink grant size given in the first column, the second, third and fourth columns indicate (i) whether or not the BSR sub-header, the CCCH sub-header, and the padding sub-header, respectively, are included in the MAC header and (ii) the size of each sub-header if included. The fifth, sixth and seventh columns indicate the size of a buffer status report, an RRC message, and padding, respectively, if included in the MAC payload. The eighth column gives the total number of MAC bits, which is the sum of the bits in the second through seventh columns. The last column gives the number of CRC bits appended to the MAC PDU by the physical layer.

TABLE 4

MAC PDU Content for Different Uplink Grant Sizes

| Uplink Grant Size | BSR Sub-header | CCCH Sub-header | Padding Sub-header | Buffer Status Report | RRC message on CCCH | Padding | Total MAC Bits | PHY CRC Bits |
|---|---|---|---|---|---|---|---|---|
| 80 | — | 8 | — | — | 48 | — | 56 | 24 |
| 96 | 8 | 8 | — | 8 | 48 | — | 72 | 24 |
| 112 | 8 | 8 | — | 24 | 48 | — | 88 | 24 |
| 128 | — | 8 | — | — | 96 | — | 104 | 24 |
| 144 | 8 | 8 | — | 8 | 96 | — | 120 | 24 |
| 160 | 8 | 8 | — | 24 | 96 | — | 136 | 24 |
| >160 | 8 | 8 or 16 | 8 | 24 | 96 | 8 * N | variable | 24 |

In the design shown in Table 4, an 8-bit or a 16-bit MAC sub-header may be used for a MAC SDU carrying an RRC message sent on the CCCH. A 48-bit or 96-bit RRC message may be sent in the MAC SDU depending on the uplink grant size. An 8-bit or 24-bit BSR may be sent in a MAC CE if the uplink grant size is sufficiently large. A MAC PDU may be filled with padding, if needed, in order to fill the MAC PDU.

In one design, only uplink grant sizes supporting incremental information may be supported, and other uplink grant sizes may be disallowed. For the design shown in Table 4, uplink grant sizes of 80, 96, 112, 128, 144 and 160 may be supported. The set of supported uplink grant sizes may be selected to utilize only the 8-bit MAC sub-header for the CCCH carrying an RRC message and to disallow padding of the MAC PDU. In another design, a MAC CE and/or a MAC SDU for an RRC message may be defined with more sizes in order to more fully utilize the available MAC PDU.

A UE may receive an uplink grant of less than 80 bits and may not be able to send an RRC message in Message 3. The UE may send just padding, or a BSR plus padding, or nothing for Message 3.

Figures 9, 10:
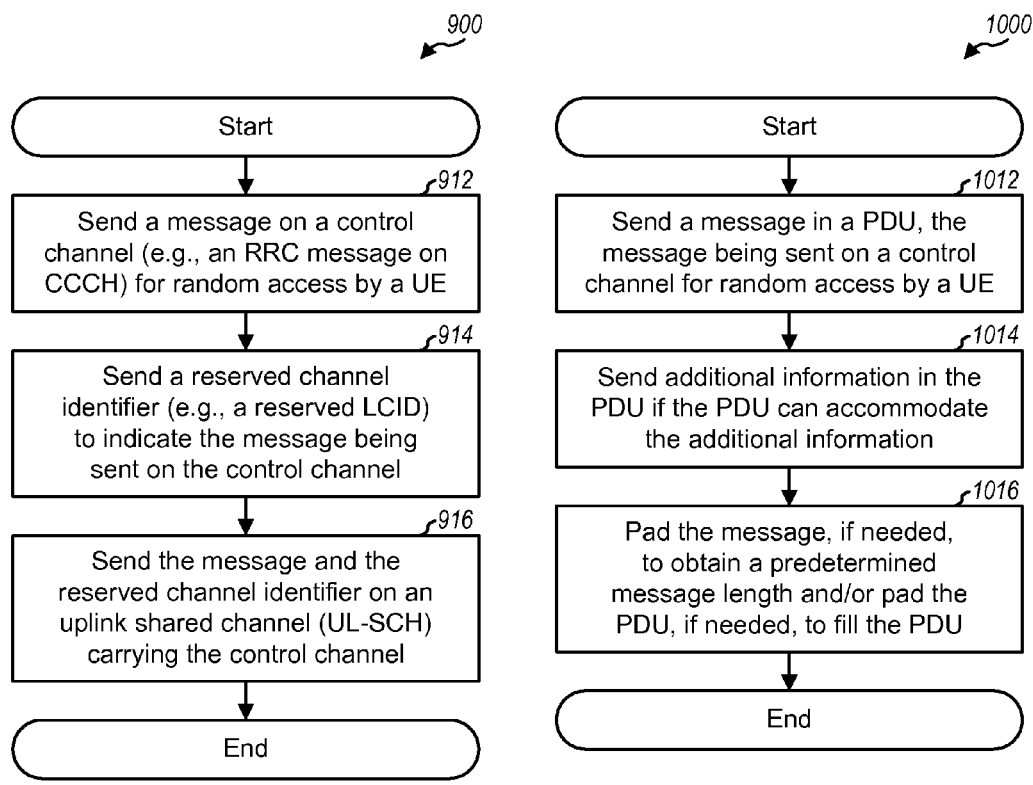
FIG. 9 shows a process for sending a message on a control channel with a reserved channel identifier for random access.
FIG. 10 shows a process for sending a message and additional information for random access.

FIG. 9 shows a design of a process 900 for performing random access. A UE may send a message on a control channel for random access (block 912). The UE may also send a reserved channel identifier to indicate the message being sent on the control channel (block 914). The UE may send the message and the reserved channel identifier on an UL-SCH carrying the control channel (block 916).

The message sent on the control channel may comprise an RRC message sent on the CCCH for random access by the UE. The RRC message may comprise an RRC Connection Re-establishment Request message for RRC connection re-establishment, an RRC Connection Request message for attachment or subsequent access, etc. The reserved channel identifier may comprise a reserved LCID, which may have a value of zero. The UE may generate a MAC SDU comprising the RRC message and may generate a MAC sub-header comprising the reserved LCID. The UE may then generate a MAC PDU comprising the MAC sub-header and the MAC SDU and may send the MAC PDU on the UL-SCH.

FIG. 10 shows a design of a process 1000 for sending a message and additional information for random access. A UE may send a message in a PDU, with the message being sent on a control channel for random access by the UE (block 1012). The UE may send additional information in the PDU if the PDU can accommodate the additional information (block 1014). The additional information may comprise a buffer status report for the UE, a power headroom report for the UE, data for the DCCH, data for the DTCH, etc. The PDU may have a variable size determined based on an uplink grant for the UE. The UE may pad the message, if needed, to obtain a predetermined message length and/or may pad the PDU, if needed, to fill the PDU (block 1016).

In one design, the message may comprise an RRC message sent on the CCCH for random access by the UE. The PDU may comprise a MAC PDU. The UE may generate a MAC SDU comprising the RRC message. The UE may also generate a MAC CE comprising a buffer status report or a power headroom report if the uplink grant for the UE can accommodate the MAC SDU and the MAC CE. The UE may generate the MAC PDU comprising the MAC SDU and the MAC CE, if generated. The UE may then send the MAC PDU for random access.

FIG. 11 shows a design of a process 1100 for sending a message with a short MAC-I for random access. A UE may generate a short MAC-I for a message sent on a control channel for random access by the UE (block 1112). The short MAC-I may have a smaller size than a full MAC-I used for integrity protection of messages sent on a control plane. The UE may send the message comprising the short MAC-I for random access (block 1114). The short MAC-I may be for an RRC message sent on the CCCH for RRC connection re-establishment. The short MAC-I may have a 16-bit size and the full MAC-I may have a 32-bit size. The short and full MAC-Is may also have other sizes.

FIG. 12 shows a design of a process 1200 for sending a UE ID for random access. A UE may set a format field of a message to a first value to indicate a first type of UE ID being sent in the message or to a second value to indicate a second type of UE ID being sent in the message (block 1212). The UE may generate the message comprising the format field and a UE ID of the type indicated by the format field (block 1214). The UE may send the message for random access (block 1216).

In one design, the first type of UE ID may be for attachment by the UE, and the second type of UE ID may be for subsequent access by the UE. In one design, the first type of UE ID may comprise a full or partial IMSI, a random ID, or some other UE ID. The second type of UE ID may comprise an S-TMSI or some other UE ID. The full or partial IMSI may be conveyed using binary representation instead of hexadecimal representation. The partial IMSI may comprise a predetermined number of LSBs of the full IMSI. Alternatively, the partial IMSI may have a variable size indicated by an IMSI length field in the message.

FIG. 13 shows a design of a process 1300 for performing random access. A UE may generate an RRC message on a CCCH for random access (block 1312). The UE may generate a MAC SDU comprising the RRC message (block 1314). The UE may generate a MAC sub-header comprising a reserved LCID to indicate the RRC message being sent on the CCCH (block 1316). The UE may generate a MAC PDU comprising the MAC sub-header and the MAC SDU (block 1318). The UE may send the MAC PDU for random access (block 1320).

For RRC connection re-establishment, the UE may generate a short MAC-I for the RRC message. The short MAC-I may have a smaller size than a full MAC-I used for integrity protection of messages sent on a control plane. The UE may generate the RRC message comprising the short MAC-I.

For attachment and subsequent access, the UE may set a format field of the RRC message to a first value to indicate a first type of UE ID being sent in the RRC message for attachment or to a second value to indicate a second type of UE ID being sent in the RRC message for subsequent access. The UE may then generate the RRC message comprising the format field and a UE ID of the type indicated by the format field.

The UE may generate a MAC CE including a buffer status report, a power headroom report, and/or other information, e.g., if the UE receives an uplink grant of a sufficient size. The UE may generate a second MAC sub-header for the MAC CE. The MAC PDU may further comprise the second MAC sub-header and the MAC CE, e.g., as shown in FIG. 8C or 8D.

An eNB may perform processing complementary to the processing by the UE in FIGS. 9 through 13. For FIG. 9, the eNB may determine that a message is sent on the control channel for random access based on the reserved channel identifier. For FIG. 10, the eNB may extract the message and the additional information, if any, from the PDU received from the UE. For FIG. 11, the eNB may authenticate the UE based on the short MAC-I obtained from the message sent by the UE for random access. For FIG. 12, the eNB may obtain a UE ID from the message sent by the UE for random access and may determine the UE ID type based on the format field in the message. For FIG. 13, the eNB may determine that an RRC message is sent on the CCCH for random access based on the reserved LCID.

Figure 14:
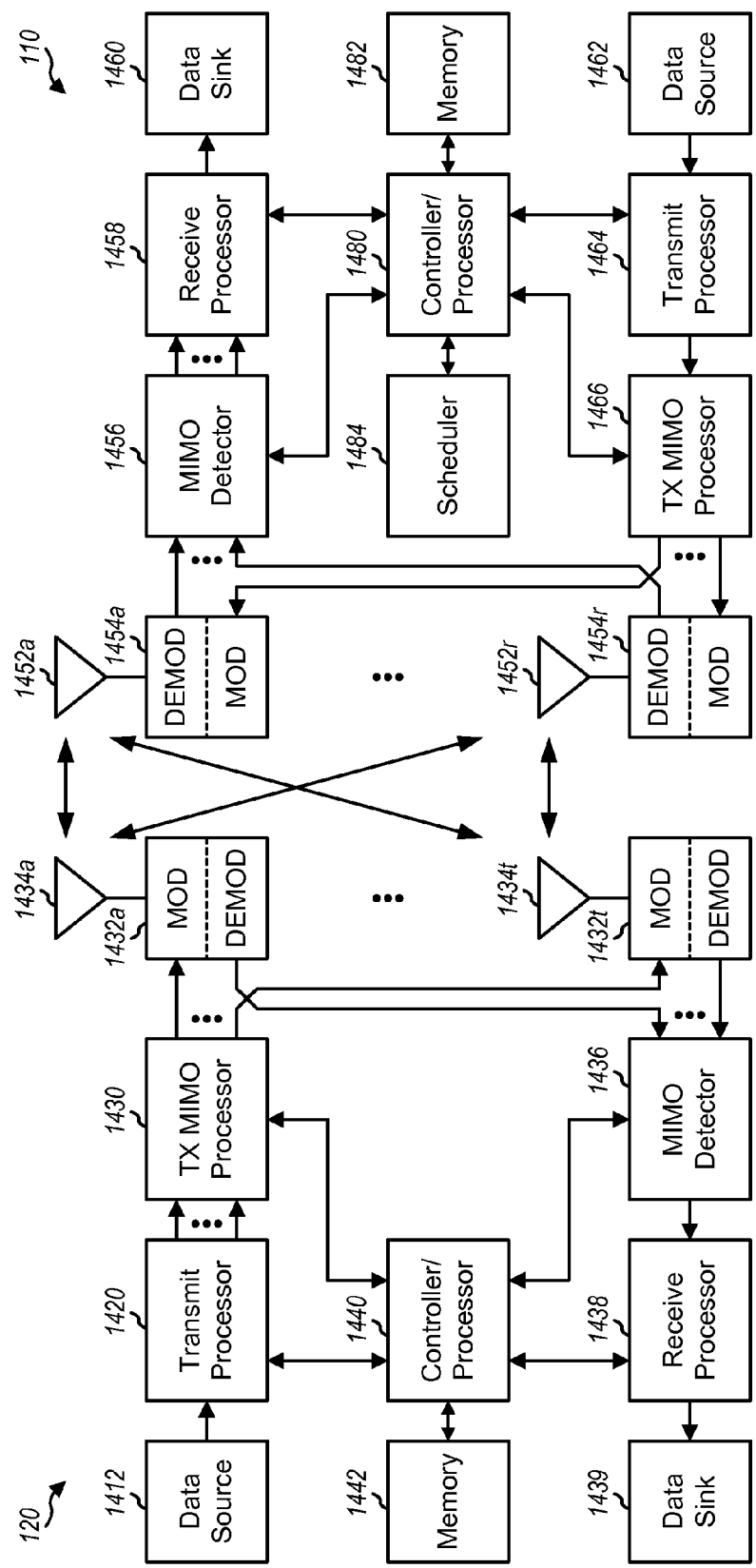
FIG. 14 shows a block diagram of an eNB/base station and a UE.

FIG. 14 shows a block diagram of a design of an eNB/base station 110 and a UE 120, which may be one of the eNBs and one of the UEs in FIG. 1. In this design, UE 120 is equipped with T antennas 1434a through 1434t, and eNB 110 is equipped with R antennas 1452a through 1452r, where in general T≥1 and R≥1.

At UE 120, a transmit processor 1420 may receive user data from a data source 1412, process the user data based on one or more modulation and coding schemes, and provide data symbols. Transmit processor 1420 may also process control data (e.g., for RRC messages, buffer status report, power headroom report, etc.) and provide control symbols. A transmit (TX) multiple-input multiple-output (MIMO) processor 1430 may multiplex the data symbols, the control symbols, pilot symbols, and possibly other symbols. TX MIMO processor 1430 may perform spatial processing (e.g., precoding) on the multiplexed symbols, if applicable, and provide T output symbol streams to T modulators (MODs) 1432a through 1432t. Each modulator 1432 may process a respective output symbol stream (e.g., for SC-FDMA) to obtain an output sample stream. Each modulator 1432 may further process (e.g., convert to analog, amplify, filter, and upconvert) the output sample stream to obtain an uplink signal. T uplink signals from modulators 1432a through 1432t may be transmitted via T antennas 1434a through 1434t, respectively.

At eNB 110, antennas 1452a through 1452r may receive the uplink signals from UE 120 and possibly other UEs and may provide received signals to demodulators (DEMODs) 1454a through 1454r, respectively. Each demodulator 1454 may condition (e.g., filter, amplify, downconvert, and digitize) a respective received signal to obtain received samples. Each demodulator 1454 may further process the received samples (e.g., for SC-FDMA) to obtain received symbols. A MIMO detector 1456 may obtain received symbols from all R demodulators 1454a through 1454r, perform MIMO detection on the received symbols if applicable, and provide detected symbols. A receive processor 1458 may process (e.g., demodulate, deinterleave, and decode) the detected symbols and provide decoded user data for UE 120 and/or other UEs to a data sink 1460. Receive processor 1458 may also provide decoded control data (e.g., RRC messages from UEs performing random access) to a controller/processor 1480.

On the downlink, at eNB 110, user data for one or more UEs from a data source 1462 and control data from controller/processor 1480 may be processed by a transmit processor 1464, precoded by a TX MIMO processor 1466 if applicable, conditioned by modulators 1454a through 1454r, and transmitted to UE 120 and other UEs. At UE 120, the downlink signals from eNB 110 may be received by antennas 1434, conditioned by demodulators 1432, processed by a MIMO detector 1436 if applicable, and further processed by a receive processor 1438 to recover the user data and control data transmitted by eNB 110 to UE 120.

Controllers/processors 1440 and 1480 may direct the operation at UE 120 and eNB 110, respectively. Controller/processor 1440 at UE 120 may perform or direct process 900 in FIG. 9, process 1000 in FIG. 10, process 1100 in FIG. 11, process 1200 in FIG. 12, process 1300 in FIG. 13, and/or other processes for the techniques described herein. Controller/processor 1480 at eNB 110 may perform or direct processes complementary to processes 900 through 1300 and/or other processes for the techniques described herein. Memories 1442 and 1482 may store data and program codes for UE 120 and eNB 110, respectively. A scheduler 1484 may schedule UEs for downlink and/or uplink transmission and may provide uplink grants for the scheduled UEs.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the disclosure herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary designs, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

The previous description of the disclosure is provided to enable any person skilled in the art to make or use the disclosure. Various modifications to the disclosure will be readily apparent to those skilled in the art, and the generic principles defined herein may be applied to other variations without departing from the scope of the disclosure. Thus, the disclosure is not intended to be limited to the examples and designs described herein but is to be accorded the widest scope consistent with the principles and novel features disclosed herein.

What is claimed is:

1. A method for wireless communication, comprising:
   generating, at a user equipment (UE), a Radio Resource Control (RRC) message on a common control channel (CCCH), the RRC message including a type field and a UE ID of a type indicated by the type field, the RRC message having a fixed length and being transmitted without a length indicator;
   generating, at the UE, a reserved logical channel identifier (LCID) to indicate the RRC message being sent on the CCCH mapped to an uplink shared channel;

setting, at the UE, the type field of the RRC message to a first value to indicate a first type of user equipment (UE) identity (ID) having a first length being sent in the RRC message or to a second value to indicate a second type of UE ID having a second length being sent in the RRC message, the first type of UE ID for attachment by the UE and the second type of UE ID for connection re-establishment by the UE;

when the RRC message is for connection re-establishment, at the UE:
generating a short message authentication code for integrity protection (MAC-I) for the RRC message, the short MAC-I having a smaller size than a full MAC-I used for integrity protection of messages sent on a control plane;
generating a MAC service data unit (SDU) including the RRC message;
generating a MAC sub-header including the reserved logical channel identifier (LCID); and
generating a MAC protocol data unit (PDU) including the MAC sub-header and the MAC SDU; and
sending, at the UE, the RRC message and the reserved LCID on the uplink shared channel carrying the CCCH as a first scheduled transmission responsive to an uplink grant conveyed to the UE by a base station.

2. The method of claim 1, wherein the reserved LCID has a value of zero.

3. The method of claim 1, wherein the first type of UE ID includes a full or partial International Mobile Subscriber Identity (IMSI) or a random ID, and wherein the second type of UE ID includes an Evolved Packet System Temporary Mobile Subscriber Identity (S-TMSI).

4. The method of claim 3, wherein the full or partial IMSI is conveyed using binary representation instead of hexadecimal representation.

5. The method of claim 3, wherein the partial IMSI includes a predetermined number of least significant bits (LSBs) of the full IMSI.

6. The method of claim 3, wherein the partial IMSI has a variable size indicated by an IMSI length field in the message.

7. The method of claim 1, wherein the generating the RRC message includes
generating the RRC message including the type field and a UE ID of the type indicated by the type field.

8. The method of claim 1, further including:
generating a MAC control element (CE) including a buffer status report or a power headroom report for the UE; and
generating a second MAC sub-header for the MAC CE, wherein the MAC PDU further includes the second MAC sub-header and the MAC CE.

9. A method for wireless communication, comprising:
generating, at a user equipment (UE), a Radio Resource Control (RRC) message in a protocol data unit (PDU), the RRC message being sent on a common control channel (CCCH), and the RRC message including a type field and a UE ID of a type indicated by the type field, the RRC message having a fixed length and being transmitted without a length indicator; and
setting, at the UE, the type field of the RRC message to a first value to indicate a first type of user equipment (UE) identity (ID) having a first length being sent in the RRC message or to a second value to indicate a second type of UE ID having a second length being sent in the RRC message, the first type of UE ID for attachment by the UE and the second type of UE ID for connection re-establishment by the UE;

when the RRC message is for connection re-establishment, at the UE:
generating a short message authentication code for integrity protection (MAC-I) for the RRC message, the short MAC-I having a smaller size than a full MAC-I used for integrity protection of messages sent on a control plane;
generating a MAC service data unit (SDU) including the RRC message;
generating a MAC sub-header including the reserved logical channel identifier (LCID); and
generating a MAC protocol data unit (PDU) including the MAC sub-header and the MAC SDU;
determining, at the UE, if the PDU can accommodate additional information based on an uplink grant for the PDU;
sending, at the UE, the RRC message and the reserved LCID on the uplink shared channel carrying the CCCH as a first scheduled transmission and the additional information in the PDU with the RRC message when the PDU can accommodate the additional information, wherein the additional information includes a buffer status report for the UE.

10. The method of claim 9, wherein the additional information further includes one of a power headroom report for the UE, data for a dedicated control channel, and data for a dedicated traffic channel.

11. The method of claim 9, wherein the PDU has a variable size determined based on the uplink grant for the UE.

12. The method of claim 9, further including:
padding the PDU, if needed, to fill the PDU.

13. The method of claim 9, wherein the PDU includes a Medium Access Control (MAC) PDU.

14. The method of claim 13, further including:
generating a MAC control element (CE) including a buffer status report or a power headroom report if the uplink grant for the UE can accommodate the MAC SDU and the MAC CE;
generating the MAC PDU including the MAC SDU and the MAC CE, if generated; and
sending the MAC PDU for random access by the UE.

15. The method of claim 13, wherein the RRC message includes padding bits, if needed, to obtain a predetermined length.

16. An apparatus for wireless communication, comprising:
at least one processor configured:
to generate a Radio Resource Control (RRC) message of on a common control channel (CCCH), and the RRC message including a type field and a user equipment (UE) ID of a type indicated by the type field, the RRC message having a fixed length and being transmitted without a length indicator,
to generate a reserved logical channel identifier (LCID) to indicate the RRC message being sent on the CCCH mapped to an uplink shared channel,
to set the type field of the RRC message to a first value to indicate a first type of user equipment (UE) identity (ID) having a first length being sent in the RRC message or to a second value to indicate a second type of UE ID having a second length being sent in the RRC message, the first type of UE ID for attachment by the UE and the second type of UE ID for connection re-establishment by the UE;
when the RRC message is for connection re-establishment:
to generate a short message authentication code for integrity protection (MAC-I) for the RRC message, the short MAC-I having a smaller size than a full MAC-I used for integrity protection of messages sent on a control plane;
 to generate a MAC service data unit (SDU) including the RRC message;
 to generate a MAC sub-header including the reserved logical channel identifier (LCID); and
 to generate a MAC protocol data unit (PDU) including the MAC sub-header and the MAC SDU; and
 to send the RRC message and the reserved LCID on an uplink shared channel carrying the CCCH as a first scheduled transmission with responsive to an uplink grant received by the UE.

17. The apparatus of claim 16, wherein the at least one processor is configured to generate a MAC control element (CE) including a buffer status report or a power headroom report for the UE, to generate a second MAC sub-header for the MAC CE, and to generate the MAC PDU further including the second MAC sub-header and the MAC CE.

18. An apparatus for wireless communication, comprising:
 means for generating a Radio Resource Control (RRC) message of on a common control channel (CCCH), and the RRC message including a type field and a user equipment (UE) ID of a type indicated by the type field, the RRC message having a fixed length and being transmitted without a length indicator;
 means for generating a reserved logical channel identifier (LCID) to indicate the RRC message being sent on the CCCH mapped to an uplink shared channel;
 means for setting the type field of the RRC message to a first value to indicate a first type of user equipment (UE) identity (ID) having a first length being sent in the RRC message or to a second value to indicate a second type of UE ID having a second length being sent in the RRC message, the first type of UE ID for attachment by the UE and the second type of UE ID for connection re-establishment by the UE;
 when the RRC message is for connection re-establishment:
  means for generating a short message authentication code for integrity protection (MAC-I) for the RRC message, the short MAC-I having a smaller size than a full MAC-I used for integrity protection of messages sent on a control plane;
  means for generating a MAC service data unit (SDU) including the RRC message;
  means for generating a MAC sub-header including the reserved logical channel identifier (LCID); and
  means for generating a MAC protocol data unit (PDU) including the MAC sub-header and the MAC SDU; and
 means for sending the RRC message and the reserved LCID on an uplink shared channel carrying the CCCH as a first scheduled transmission with responsive to an uplink grant conveyed to the UE by a base station.

19. The apparatus of claim 18, further including:
 means for generating a MAC control element (CE) including a buffer status report or a power headroom report for the UE; and
 means for generating a second MAC sub-header for the MAC CE, wherein the MAC PDU further includes the second MAC sub-header and the MAC CE.

20. A non-transitory computer-readable medium comprising:
 code for causing at least one computer to generate a Radio Resource Control (RRC) message of on a common control channel (CCCH), and the RRC message including a type field and a user equipment (UE) ID of a type indicated by the type field, the RRC message having a fixed length and being transmitted without a length indicator,
 code for causing the at least one computer to generate a reserved logical channel identifier (LCID) to indicate the RRC message being sent on the CCCH mapped to an uplink shared channel,
 code for setting the type field of the RRC message to a first value to indicate a first type of user equipment (UE) identity (ID) having a first length being sent in the RRC message or to a second value to indicate a second type of UE ID having a second length being sent in the RRC message, the first type of UE ID for attachment by the UE and the second type of UE ID for connection re-establishment by the UE;
 when the RRC message is for connection re-establishment:
  code for generating a short message authentication code for integrity protection (MAC-I) for the RRC message, the short MAC-I having a smaller size than a full MAC-I used for integrity protection of messages sent on a control plane;
  code for generating a MAC service data unit (SDU) including the RRC message;
  code for generating a MAC sub-header including the reserved logical channel identifier (LCID); and
  code for generating a MAC protocol data unit (PDU) including the MAC sub-header and the MAC SDU; and
 code for causing the at least one computer to send the RRC message and the reserved LCID on an uplink shared channel carrying the CCCH as a first scheduled transmission with responsive to an uplink grant allocated to the UE.

* * * * *